Oct. 19, 1965 D. W. RICE 3,212,799
PIPE COUPLING
Filed May 22, 1962
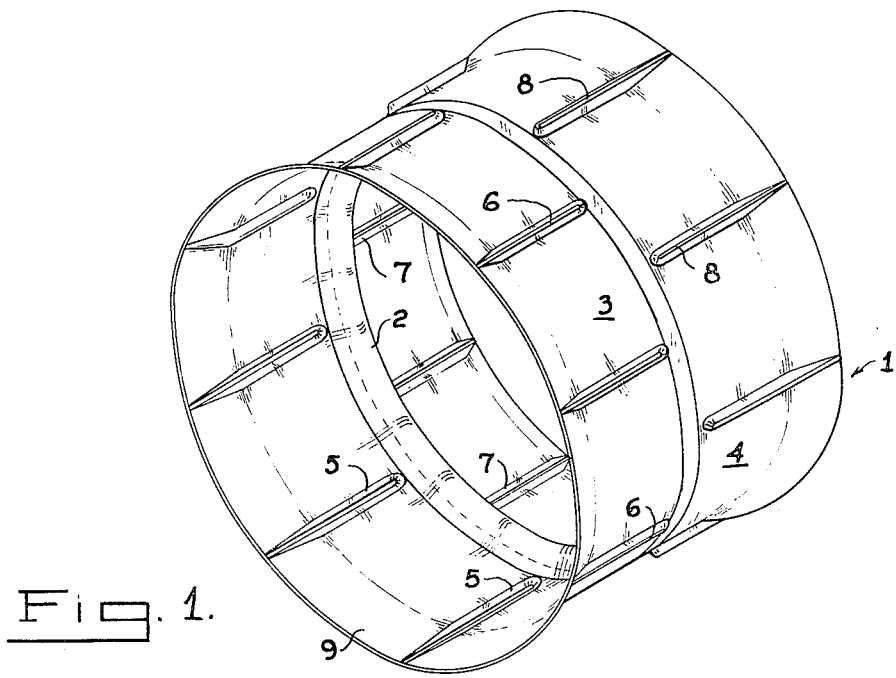
Fig. 1.
Fig. 2.
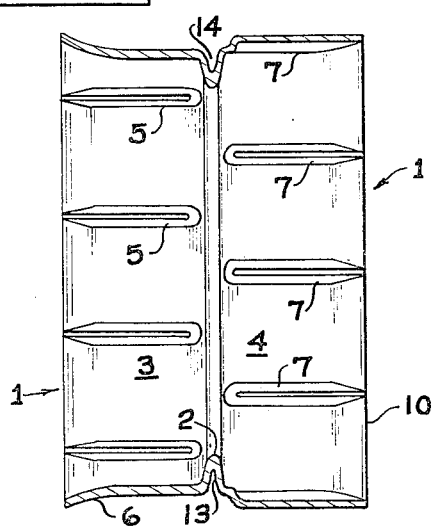
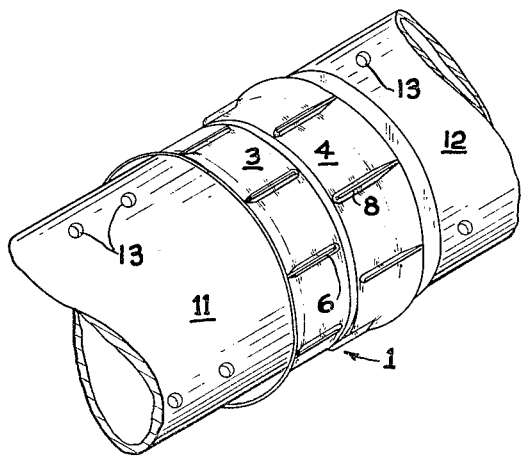
Fig. 3.
INVENTOR.
DAVID W. RICE
BY
*John A. McKinney*
ATTORNEY

United States Patent Office 3,212,799
Patented Oct. 19, 1965

3,212,799
PIPE COUPLING
David W. Rice, Somerville, N.J., assignor to Johns-Manville Corporation, New York, N.Y., a corporation of New York
Filed May 22, 1962, Ser. No. 196,797
3 Claims. (Cl. 285—235)

The instant invention relates to couplings and in particular to a coupling for joining adjacent ends of pipe and more specifically for joining adjacent ends of unmachined asbestos-cement pipes.

The present joint for underdrain asbestos-cement pipe uses a cylindrical plastic coupling in combination with machined tapered ends on the pipe. A major disadvantage of this type of joint is in the field use thereof since, if a secion of pipe is inadvertently broken, a new taper has to be provided on the end of the broken pipe. Also, the use of this type of joint requires an additional machining step in the normal manufacture of the pipe.

It is an object of the instant invention to provide a joint for pipe where water tightness is of no primary concern but which will provide proper protection against the excessive infiltration of undesirable elements.

It is another object of the instant invention to provide a coupling for joining adjacent ends of unmachined pipe.

The foregoing objects are accomplished in accordance with the instant invention by a generally cylindrical coupling comprising a semi-elastic material and having flared ends. An internal rib divides the coupling into two sections each of which have substantially equal axial extent. Each of the sections are provided with a plurality of corrugations each of which extend generally in an axial direction and are spaced circumferentially one from another. The main body of each of the corrugations extends substantially from a position adjacent the flared end to a terminal portion adjacent the terminal rib with the corrugations in one of the sections being out of axial alignment with the corrugations in the other of the sections. In joining adjacent unmachined ends of pipe, the corrugations in each section of the coupling deform or flatten out and this together with the semi-elastic nature of the material of the coupling cooperate so that the coupling may accommodate various irregularities in the pipe end. The misalignment of the corrugations in one section of the coupling relative to the corrugations in the other section of the coupling operates to minimize the effect that the deformation of the corrugations in one section of the coupling has on the other section of the coupling. Also, the rib dividing the coupling functions to minimize the effect that the deformation of the corrugations in one section of the coupling has on the other section of the coupling.

The invention will be more fully understood and further objects and advantages thereof will become apparent when reference is made to the following detailed description of a preferred embodiment of the invention and the accompanying drawings in which:

FIG. 1 is a pictorial representation of a coupling formed in accordance with the instant invention;

FIG. 2 is a view in cross section of a coupling formed in accordance with the instant invention; and FIG. 3 is a pictorial representation of a joint being made in accordance with the instant invention.

Referring now to the drawings and in particular to FIGS. 1 and 2, there is illustrated a preferred form of the coupling made in accordance with the instant invention. As illustrated in FIG. 1, the coupling 1 is generally cylindrical in nature and comprises a semi-elastic material such as conventional polyethylene. An internal rib 2 divides the coupling 1 into two sections 3 and 4 of substantially equal dimensions. As described below, rib 2 also functions to provide automatic end separation and sleeve centering for the joint. The section 3 is provided with a plurality of corrugations 5 extending generally in an axial direction and spaced circumferentially thereof one from the other. The corrugations 5 extend generally radially outwardly and open radially inwardly so as to provide substantially a plurality of axially extending pockets opening radially inwardly. The external surface of the section 3 is continuous but has the radially extending ribs 6 formed by the external surface of the corrugations 5. The section 4 is provided with a plurality of corrugations 7 and ribs 8 similar in all respects to the corrugations 5 and the ribs 6. As illustrated in FIG. 1, corrugations 7 and ribs 8 in the section 4 are misaligned in an axial direction from the corrugations 5 and ribs 6 in the section 3. The end 9 of the section 3 and the end 10 of the section 4 are flared outwardly so as to have an inside diameter greater than the inside diameter in the remaining portions of the sections 3 and 4. The flared ends 9 and 10 are formed so that the minimum inside diameter thereof is slightly greater than the maximum allowable outside diameter of the pipe end to be accommodated. Also, the minimum inside diameter of the sections 3 and 4 is slightly less than the minimum outside diameter of the pipe end to be accommodated so as to insure in all cases a contiguous relationship between the pipe end and the coupling.

In FIG. 3, there is illustrated a joint in the process of being formed comprising a pair of adjacent pipe ends 11 and 12 of conventional underdrain pipe having perforations 13 therein and a coupling 1 made in accordance with the instant invention. As illustrated in FIG. 3, specifically by the pipe end 12, it is not necessary to machine the ends of the pipe prior to the insertion thereof into the coupling 1.

The assembly of a joint using the coupling 1 of the instant invention is illustrated in FIG. 3. A coupling 1 is placed over the unmachined pipe end 11 and positioned thereon until the frictional forces between the pipe end and the coupling stop the further insertion of the pipe end into the coupling. In most instances, this occurs when the extremity of the pipe end reaches a position adjacent the end of corrugations 5 adjacent the rib 2. However, in some instances the pipe end may be inserted until the axial extremity of the pipe end 11 contacts one side of the rib 2. The pipe end 12 is then inserted into section 4 of the coupling 1 and pushed into section 4 until stopped by frictional forces similar to that described above in relation to pipe end 11 and section 3 or until the axial extremity thereof contacts the other side of the rib 2. In those instances where the pipe ends 11 and 12 abut against the rib 2 and in those instances wherein the frictional forces prevent further entry into the coupling, the semi-elastic nature of the material of the coupling and therefore of the rib 2 together with the slight opening 14 allows for the movement of the pipe ends 11 and 12 relative to each other in response to expansion and contraction forces. As explained above, the flared ends 9 and 10 of the sections 3 and 4 have inside diameters of a nature to expedite the insertion of the pipe ends 11 and 12 into the coupling 1. Also, the corrugations 5 and 7 together with the semi-elastic nature of the material in the coupling 1 allow each section 3 and 4 of the coupling 1 to stretch over the pipe end so as to accommodate varying dimensions or irregularities in the pipe end and yet provide sufficient axial rigidity in the coupling so as to withstand the axially directed forces utilized in assembly of the joint. Although the joint, as described in the instant invention, does not have to be water tight, it must provide resistance to the infiltration of the material, such as a concrete sand backfill, used as a filter for the pipe line. Also, the combination of the flexure strength and the maximum deflection of the joint should be sufficient to withstand forces on and movement of the line resulting from backfilling and subsequent reasonable shifting of the soil without failing or distorting the joint to the extent that serious pipe misalignment and/or backfill infiltration would occur.

The following example is given for purposes of illustration only and it is not intended to limit the invention in any manner. A coupling 1 for use with a 6 inch underdrain pipe comprising asbestos-cement was provided so that each of the sections 3 and 4 would accommodate a pipe end having an outside diameter as large as 7.05 inches and yet grip a pipe having an outside diameter as small as 6.80 inches. The coupling described above was formed from a semi-elastic conventional polyethylene having a specific gravity of 0.913 and had a wall thickness of about 0.07 inch with an inside diameter of about 6.70 inches which at the flared ends 9 and 10 was increased to about 7.10 inches. The coupling had an axial extent of about 4.75 inches and the lip 2 had an axial extent of about 0.15 inch. Pipe joints utilizing couplings in accordance with the instant invention may be assembled by hand at moderate temperatures. Under cold temperature conditions, namely, about 20° F., a coupling similar to that described above and accommodating a pipe end having an outside diameter of approximately 7.05 inches can be driven on by using a heavy board.

In the coupling illustrated in FIGS. 1–3, inclusive, the corrugations 7 are misaligned relative to the corrugations 5 so as to lay equidistantly between corrugations 5. However, this arrangement is for illustration purposes only since in the preferred embodiment of the invention, it is only desirable that the corrugations 7 be misaligned an amount sufficient to disrupt any continuity between the corrugations. Also, each of the corrugations 5 and 7 terminate in an axial direction adjacent to the lip 2. This combination of misaligned corrugations and termination thereof adjacent the rib 2 prevents the stretching of one section of the coupling 1 from influencing the other section of the coupling in any manner.

While the invention has been described in rather full detail, it will be understood that these details need not be strictly adhered to and that various changes and modifications may suggest themselves to one skilled in the art, all falling within the scope of the invention as defined by the subjoined claims.

What I claim is:
1. A coupling for use with adjacent pipe ends for forming a joint comprising:
   (a) a tubular coupling comprising a semi-elastic synthetic resin material,
   (b) said coupling comprising two separate tubular sections joined by an integral rib,
   (c) each of said sections having a plurality of circumferentially spaced, independently formed corrugations therein, the adjacent corrugations in one section being circumferentially displaced from the adjacent corrugations in the other section in such a manner that the corrugations of one section are axially misaligned from the corrugations in the other section,
   (d) said corrugations in each of said sections extending generally in an axial direction,
   (e) each of said corrugations having an axial inner extremity adjacent said integral rib,
   (f) said corrugations opening radially inwardly, and axially outwardly,
   (g) said corrugations allowing each of said sections to expand so that pipe ends of varying dimensions may be readily accommodated and still provide sufficient rigidity to resist deformation from generally axially directed forces applied thereto during the assembly of the joint, and
   (h) said inner extremities of each of said corrugations cooperating with said integral rib to minimize any effect that deformation of the corrugations in one of said sections has on the other of said sections.
2. A coupling as defined in claim 1 wherein:
   (a) each of said sections having flared ends having an inside diameter greater than the inside diameter of the other portion of said section for facilitating the insertion of a pipe end.
3. A coupling as defined in claim 1 wherein:
   (a) said integral rib comprises a pair of generally radially extending walls joined integrally to each other at one end to form the smallest inner diameter of said coupling and joined integrally to an adjacent tubular section at their other end.

References Cited by the Examiner
UNITED STATES PATENTS

| 1,058,683 | 4/13 | Boothe | 285—417 |
| 1,811,277 | 6/31 | Mosley | 285—237 |
| 2,116,165 | 5/38 | Ullman | 285—419 |
| 2,610,733 | 9/52 | Balaseuich | 285—397 |
| 2,890,899 | 6/59 | Simmons | 285—235 |

FOREIGN PATENTS

| 623,471 | 7/61 | Canada. |

CARL W. TOMLIN, *Primary Examiner.*